Dec. 31, 1935.  C. E. REED  2,026,323
REAMER CUTTER ASSEMBLY FOR EARTH BORING DRILLS
Filed March 18, 1935
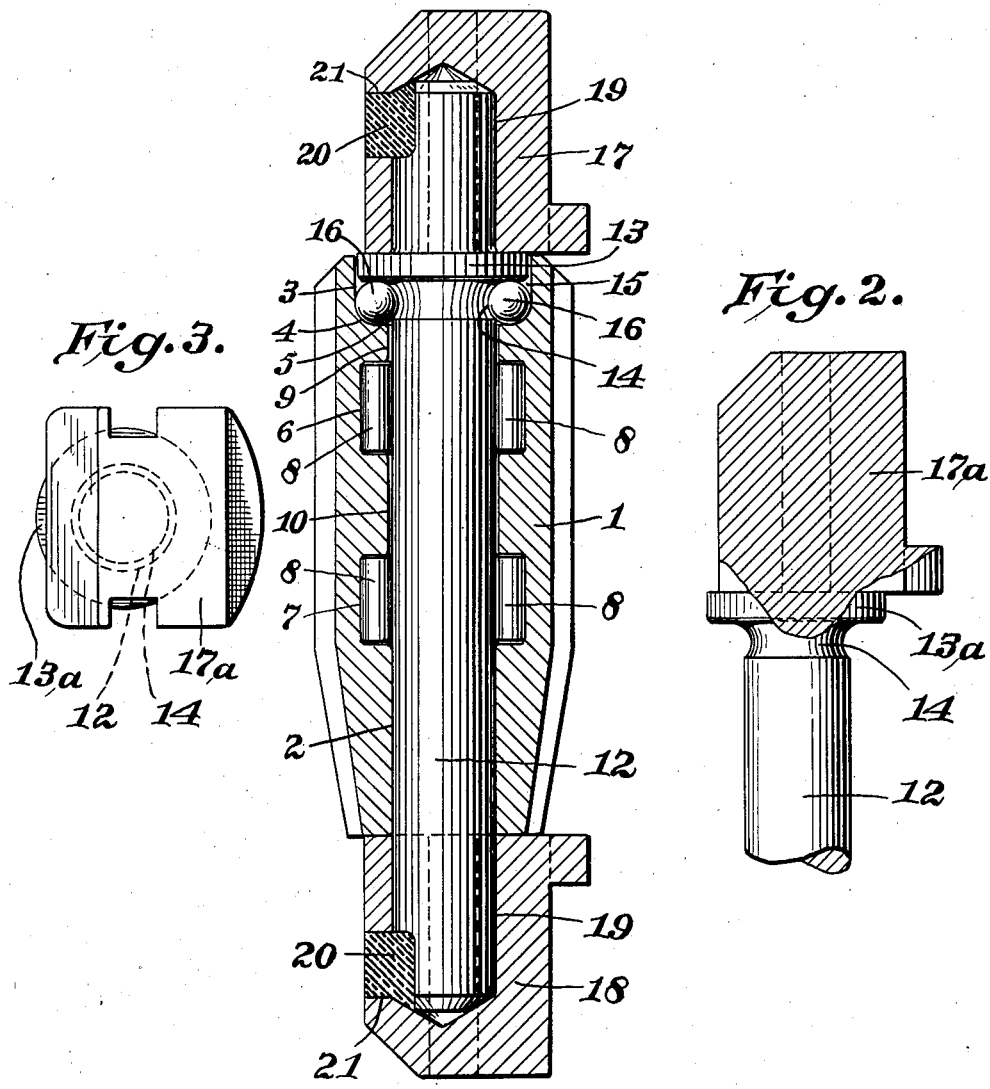
Clarence E. Reed
INVENTOR Patented Dec. 31, 1935

2,026,323

UNITED STATES PATENT OFFICE 2,026,323

REAMER CUTTER ASSEMBLY FOR EARTH BORING DRILLS

Clarence E. Reed, Wichita, Kans.

Application March 18, 1935, Serial No. 11,703

15 Claims. (Cl. 255—73)

This invention relates to earth boring tools and more particularly to the bearing structure for reamer cutters.

An object of the invention is to promote free rotary motion of the reamer cutter in order to secure improved reaming of the bore hole.

More specifically, an object of the invention is to provide a reamer cutter with anti-friction bearings which sustain radial and end thrust loads on the cutter.

The accompanying drawing shows in Fig. 1 an elevation partly in section of a reamer cutter assembly embodying one form of the invention.

Fig. 2 is a detail view of a modification showing the spindle and a spindle support in one piece.

Fig. 3 is an end view of the modification shown in Fig. 2.

The cutter 1 may be of any desired external formation since the invention is not limited to any particular structure in this regard. As here shown the cutter is of cylindrical shape for a major extent of its length and is of frusto-conical shape at its lower portion. Through this cutter is formed an axial bore 2. The upper end portion 3 of this bore is of an enlarged diameter providing at its bottom a curved anti-friction raceway, a portion 4 of which is concentric to the axis of the spindle and another portion 5 of which is on the shoulder perpendicular to the spindle axis.

Between the ends of the cutter and within the bore thereof are formed spaced apart annular grooves 6 and 7. The inner wall of these grooves as here shown are concentric with the axis of the spindle to provide a raceway for cylindrical roller bearings 8. Between the raceways 5, 6 and 7, the bore of the cutter may be slightly enlarged as shown at 9 and 10, relative to the portion of the bore below raceway 7.

Positioned within the bore of the cutter is a spindle 12 of a length to project beyond the ends of the cutter. This spindle is of a diameter to fit the portion of the bore 2 below raceway 7 and provide a friction bearing therebetween. Within raceways 6 and 7 are the roller bearings 8 of a diameter to contact both the spindle and the inner wall of these grooved raceways. It will be noted that the bore portions 9 and 10 are thereby spaced from the spindle and full advantage is obtained of the anti-friction quality of the rollers 8.

At the upper end of the spindle is formed an annular flange 13. Immediately below this flange a curved groove 14 is formed in the spindle to provide a raceway 15 for ball bearings 16, partly on the spindle and partly on the flange 13, opposing the raceway portion 5 of the cutter. Due to this relation the balls 16 sustain both radial and end thrusts upon the cutter. It will be noted that as here shown the bore enlargement 3 is of a depth to receive the balls and a substantial portion of the flange 13 therein.

The ends of the spindle may be carried by supporting blocks 17 and 18 having recesses 19 therein receiving the spindle ends. To retain the spindle within the blocks 17 and 18, welding 20 may be applied through openings 21 into the recesses in 17 and 18. The upper face of the flange 13 should seat against the bottom of the upper block 17 to transmit thrust thereto. The positioning of the lower block 18 close to the cutter limits downward movement of the cutter.

In assembling these parts the rollers 8 are positioned within the raceways 6 and 7 and the spindle is inserted into the bore and past the rollers to retain them in place. The balls 16 are then located in the raceway 15 and the spindle thereafter dropped finally into assembled position. The supporting block 18 is then secured to the lower end of the spindle, while the upper supporting block 17 may be applied at any time during the assembly.

It will be understood that the invention is not limited to the particular means shown for carrying the ends of the spindle but that any other desired means may be employed. The particular manner of mounting the supporting blocks in a reamer body forms no part of this invention and therefore is not shown, but if desired the arrangement disclosed in my application Ser. No. 714,155, filed March 5, 1934 which has matured into Patent No. 1,999,132 granted April 23, 1935, may be utilized.

In Fig. 2 is shown a modification in which the support for the upper end of the spindle is formed integrally therewith. This support is of substantially the same form as the support 17 of Fig. 1 together with the flange. These parts are marked 17a and 13a in this modification, it being noted that they, together with the spindle proper are all integral with each other. Like in the form first described the raceway for the balls is formed curved in section in the plane of the spindle axis conforming to the curve of the ball, and the part 13a which corresponds to the flange 13 of the first form extends across the open end enlarged bore of the roller cutter. In the form first described the welding of the block 17 to the shank of the spindle provides a spindle support substantially like that of Fig. 2 in the sense that a spindle support is provided having a portion extending across the open end bore of the cutter and forming a part of the raceway for the ball bearings taking end thrust of said cutter and with the spindle taking radial loads.

I claim:

1. A reamer cutter assembly for earth boring drills comprising a roller reamer cutter having a bore enlarged at its upper end, curved in section in the plane of the axis of the cutter, providing a portion of a ball race, a spindle fitting in the bore of the cutter, and a spindle support having at their junction and partly on the spindle and partly on the support the other portion of said ball race and ball bearings in the enlarged bore of the cutter rolling on said race portions of the spindle and support, and a support for the lower end of the spindle, said upper and lower supports being adapted to be connected to a reamer body, substantially as described.

2. A reamer cutter according to claim 1 in which the support for the spindle has a portion extending across the enlarged bore at the upper end of the cutter, substantially as described.

3. A reamer cutter assembly according to claim 1 in which the bore of the cutter at a point intermediate thereof is provided with an annular groove in its wall and rolling bearings in said groove contacting the periphery of the spindle and the bottom of said groove.

4. A reamer cutter assembly for earth boring drills comprising a roller reamer cutter having a bore which is enlarged at the upper end of the cutter, a spindle supporting means having a portion extending transversely across the said enlarged bore, ball bearings in the enlarged bore contacting the wall thereof and the transversely extending portion of the spindle supporting means, said reamer cutter having a groove in its bore, intermediate its length, rolling bearings in said groove, a spindle extending through the bore of the cutter, supporting means for said spindle, said cutter having a portion in friction bearing contact with the spindle, substantially as described.

5. A reamer roller cutter for earth boring drills comprising a toothed member having a bore with an enlargement at the upper end thereof, a groove in the wall of said bore, the said bore having a portion of a diameter to have frictional contact with a spindle, substantially as described.

6. A spindle for a reamer cutter of earth boring drills having at its upper end an integral enlargement, with a raceway for ball bearings adjacent and below said enlargement, said enlargement being fixed to a supporting block adapted to be seated in a reamer body.

7. A spindle for a reamer cutter of earth boring drills having at its upper end an integral enlargement, with a raceway for ball bearings adjacent and below said enlargement, said enlargement being fixed to a supporting block adapted to be seated in a reamer body, said raceway being curved in section in the plane of the axis of the spindle to conform to the curve of the balls and being partly on the spindle and partly on the said enlargement.

8. A reamer cutter assembly comprising a reamer cutter having within its upper end a recessed raceway, portions of which are concentric with and perpendicular to the cutter axis, a spindle and flanged enlargement providing a raceway, portions of which are concentric with and perpendicular to the axis of the spindle and flanged enlargement, said raceways being spaced from each other to receive balls therebetween, ball bearings between said raceways taking radial and end thrusts of the cutter, support means for said spindle and flanged enlargement at the upper end of the cutter, and support means at the lower end of the cutter resisting lateral and longitudinal displacement of the cutter.

9. A reamer cutter assembly, comprising a reamer cutter having an axial bore therethrough the upper end portion of said bore being enlarged to provide a ball raceway, a spindle within the bore of the reamer cutter and extending beyond the lower end of the cutter, a flange enlargement disposed at the upper end of the reamer cutter, said spindle and the flange providing a ball raceway at the juncture of their faces, ball bearings between said raceways, and spindle supporting means at the upper and lower ends of the roller cutter.

10. A reamer cutter assembly according to claim 9 in which the enlargement of the bore at the upper end of the cutter is of a depth to receive said balls and flange therein.

11. A reamer cutter assembly according to claim 9 in which the spindle has an annular groove immediately below the flange to provide an extending bearing surface for the balls.

12. A reamer cutter assembly comprising a spindle having at its upper end an annular enlargement, a reamer cutter rotatably mounted on the spindle, said cutter having an anti-friction raceway at its upper end, ball bearings between the cutter raceway and said annular enlargement sustaining upward axial thrusts of the cutter, and spindle mounting means at the upper and lower ends of the spindle.

13. A reamer cutter assembly comprising a cutter having an axial bore therethrough and having an annular internal groove therein providing an anti-friction raceway intermediate the length of the cutter, a spindle within the bore of the cutter, and anti-friction rolling members within said groove and bearing upon the spindle to sustain radial loads on the cutter.

14. A reamer cutter assembly according to claim 13 in which the cutter has a frictional bearing upon the spindle below the rolling members.

15. A reamer cutter assembly comprising a reamer cutter having an axial bore therethrough and an annular internal groove between the ends of the cutter, the upper end portion of said bore having an outwardly opening enlargement providing a recessed raceway, a spindle within the bore of the reamer cutter and having an annular enlargement at the upper end of the cutter, anti-friction members between said recessed raceway of the cutter and the enlargement sustaining axial thrusts of the cutter, and anti-friction members within said groove and bearing upon the spindle to sustain radial thrusts of the cutter.

CLARENCE E. REED.